2,711,968

STABILIZATION OF ZINC SULFIDE WHITE PIGMENT

George F. Conery, Indian Orchard, and George W. Ingle, Hampden, Mass., assignors to Monsanto Chemical Company, St. Louis, Mo., a corporation of Delaware No Drawing. Application September 5, 1952, Serial No. 308,144

1 Claim. (Cl. 106—293)

This invention relates to a modified zinc sulfide pigment. More particularly the invention relates to a zinc sulfide pigment composition which will not darken under the influence of actinic light.

Zinc sulfide is a whtie pigment of high hiding power. However, its use has been strictly limited because it sometimes turns black under the influence of actinic radiation and especially in direct sunlight.

One object of this invention is to provide a new pigment composition.

A further object is to provide a pigment based on zinc sulfide which does not darken under the influence of actinic radiation.

These and other objects are attained by intimately mixing 100 parts by weight of zinc sulfide pigment with from 40 to 45 parts by weight of a particulate magnesium oxide having a particle size ranging from 0.05 to 0.1 micron.

The following examples are given in illustration and are not intended as limitations on the scope of this invention. Where parts are mentioned they are parts by weight.

Example I

Prepare an aqueous slurry of a commercial zinc sulfide pigment comprising substantially pure zinc sulfide in particulate form. The slurry should consist of 100 parts of pigment in 50 parts of water. Divide the slurry into two equal parts and thoroughly mix with one of these, 21 parts of magnesium oxide pigment having a particle size ranging from 0.05 to 0.1 micron. Prepare smears of each of the slurries on a glass plate and allow the water to evaporate. Expose the dried pigments to strong sunlight. The unmodified zinc sulfide pigment will discolor within a few hours but the modified pigment will remain white.

Example II

The experiment in Example I is somewhat difficult to complete since the dry powder on the glass plates is easily contaminated or blown away by air currents. A more satisfactory test is to incorporate the pigments in polystyrene molding powder, mold test samples and then expose the test samples to the actinic radiation. Therefore, the following tests may be performed. Dry-blend 100 parts of a polystyrene molding powder with 1 part of a pure zinc sulfide pigment. Similarly, dry-blend 100 parts of the same batch of polystyrene molding powder with 1 part of a zinc sulfide pigment intimately mixed with 45 parts of magnesium oxide per 100 parts of zinc sulfide, said magnesium oxide having a particle size of 0.05 to 0.1 micron and a zinc sulfide pigment intimately mixed with 45 parts of magnesium oxide having a particle size of over 1 micron. Injection mold the dry-blends to provide thin discs of pigmented polystyrene. Expose the discs to actinic radiation. The discs containing unmodified zinc sulfide and zinc sulfide modified with the larger particle size magnesium oxide darken quickly whereas the disc containing the magnesium oxide of this invention remains white.

Similar results are obtained if the pigments are dispersed in linseed oil, a film is formed from the dispersions and the films are subjected to actinic adiation.

The actinic radiation used in the examples to test the stability of the pigment may be strong sunlight or radiation from an ultraviolet arc. In the latter case, it is advantageous to submerge the test samples in shallow trays filled with water, the surface of the samples being about 1 inch below the surface of the water. This exposure under water more nearly approximates actual weathering conditions in a humid atmosphere than direct exposure to the ultraviolet arc. Using the arc the stability of the pigments may be determined in a matter of hours compared to several days in direct sunlight when the pigment is incorporated in a plastic material.

The stabilization of the zinc sulfide pigment is specific to magnesium oxide having a particle size of 0.05 to 0.1 micron. Other magnesium salts even in the same particle size range are ineffective. It has also been found that the ratio of magnesium oxide to zinc sulfide is critical and should be restricted to from 40 to 45 parts of magnesium oxide per 100 parts of zinc sulfide. Below this amount substantially no protective action is observed and above this amount the whiteness and opacity of the zinc sulfide is seriously impaired.

The zinc sulfide pigment originally used must be substantially pure. If it contains more than mere traces of other metallic elements notably iron, the stabilization action is substantially ineffective. After the zinc sulfide is stabilized it may be mixed with colored pigments to give various shades of white or pastel colors without destroying the stabilization.

The stabilization of the zinc sulfide pigment according to the process of this invention makes it possible to use zinc sulfide in applications where it has hitherto been rejected by reason of its characteristic discoloration. For example, the stabilized zinc sulfide pigment may be used in exterior paints based on linseed oil or other drying oils, alkyd resin, etc. and in nitrocellulose lacquers. It also remains permanently white in rubber, both natural and synthetic and in the various plastics, both thermoplastic and thermosetting.

What is claimed is:

A white pigment stable to actinic radiation consisting of 100 parts of substantially pure zinc sulfide and from 40 to 45 parts of magnesium oxide having a particle size ranging from 0.05 to 0.1 micron.

References Cited in the file of this patent

UNITED STATES PATENTS

| | | |
|---|---|---|
| 212,016 | Knight | Feb. 4, 1879 |
| 2,181,651 | Calbeck | Nov. 28, 1939 |

OTHER REFERENCES

J. Toko Chem. Soc., vol. 41 of 1920, pages 1054–1067; abstract in 106-293.